Jan. 3, 1950 K. F. KRON 2,493,295
VEHICLE SUPPORT
Filed Feb. 8, 1946
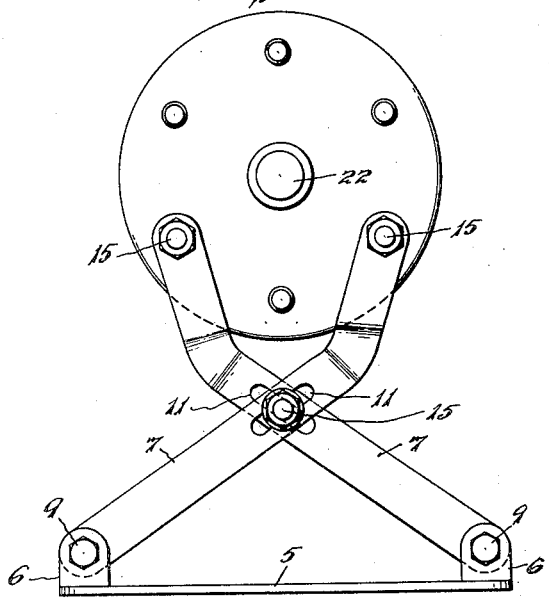
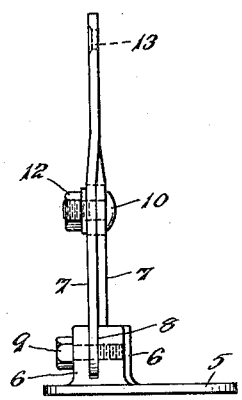
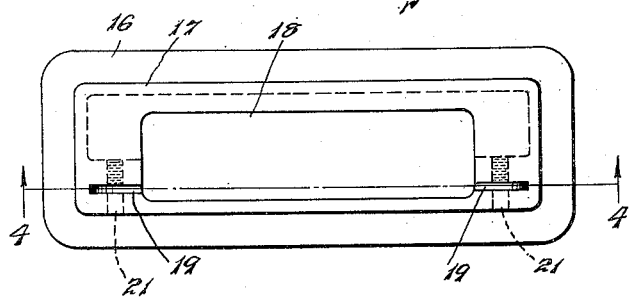
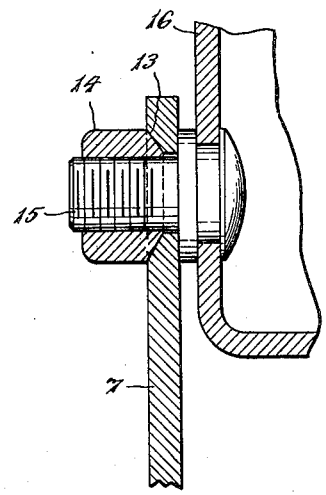
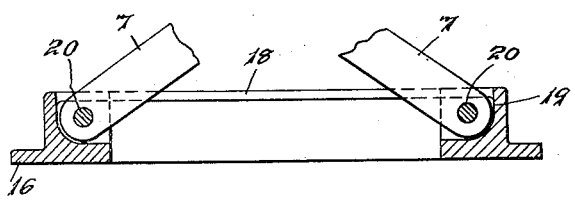
Inventor
KENNETH F. KRON.
By
Louis V. Lucia.
Attorney Patented Jan. 3, 1950

2,493,295

UNITED STATES PATENT OFFICE 2,493,295

VEHICLE SUPPORT

Kenneth F. Kron, New Britain, Conn.

Application February 8, 1946, Serial No. 646,237

2 Claims. (Cl. 248—352)

This invention relates to a vehicle supporting jack and more particularly to a jack which is adapted to be secured to the brake drum of a motor vehicle for supporting the vehicle after a wheel has been taken off.

An object of this invention is to provide a jack which can be easily and quickly adjusted to fit the wheel fastening lugs on brake drums of different sizes, so that the vehicle will be supported safely, and thereby permit removal of the mechanical jack used to lift the vehicle.

Further objects and advantages of this invention will be more clearly understood from the following description and from the accompanying drawings, in which—

Figure 1 is an elevational side view of a jack embodying my invention and illustrating the same as attached to the brake drum of a vehicle while in use.

Figure 2 is an elevational side view of said jack.

Figure 3 is a plan view of a modified form of a base for said jack.

Figure 4 is a sectional side view of said base, on line 4—4 of Fig. 3, and showing portions of the supporting levers connected thereto.

Figure 5 is an enlarged fragmental view illustrating the manner in which the jack is secured to the brake drum.

As shown in the drawings, my improved jack comprises a base 5 having supporting brackets 6—6 extending vertically from the base. A pair of supporting bars 7—7 are provided with one end pivotally mounted in slots 8, in each of said brackets 6—6, by means of bolts 9 which are threaded to said brackets and extend across the slots 8 and through holes in the ends of the bars 7—7.

The said bars are joined together by means of a loose connection consisting of a bolt 10 extending through slots 11—11 in said bars, and slidably secured together with a nut 12.

As shown in Fig. 2, the upper portion of said bars 7—7 are bent in opposite directions in order to align them where they are attached to the vehicle.

As shown in Fig. 5, the attachment holes which extend through the ends of said bars may be countersunk, as at 13, to receive the conventional form of wheel fastening nut 14 which is threaded to the studs 15 on the brake drum 16.

In the use of my improved jack, the bars 7—7 are first adjusted so that their upper ends are spaced to conform with two studs 15 on the brake drum. It is preferred that the uppers of the bars be as far apart as possible, for steadier support of the vehicle, and this may be accomplished by spanning one of the studs on the brake drum and using the two studs, as shown, that are spaced farther apart. When the bars 7—7 are adjusted, the nut 12 may be tightened to secure said bars together and prevent displacement of the jack under the weight of the vehicle.

In the modified form shown in Figs. 3 and 4, the said base may be constructed of a casting having a surrounding flange 16 and a raised portion 17 with a central opening 18. Notches 19—19 are formed in the opposite ends of said raised portion to receive the ends of the bars 7—7 as shown in Fig. 2, and bolts 20—20 may be extended through the holes 21—21 and threaded to the opposite side of the notches 19—19 for pivotally supporting said bars. In this form, an additional safety feature is attained for the reason that, should the bolts 20—20 break under the load of the vehicle, the ends of the bars will seat in the notches 19—19 and permit the bars 7—7 to still support the vehicle.

It will be noted from Fig. 1 that, when the improved jack is used, the vehicle will be supported from both sides of the axis of the axle, indicated at 22, so that the vehicle will be safely and securely supported even with the brake drum released.

I claim:

1. A vehicle supporting jack of the character described comprising a base, a pair of bars pivotally secured to said base and projecting upwardly therefrom in relatively crossed relation, the upper ends of said bars being offset towards each other and having apertures therein to receive projections on the wheel drum of a motor vehicle for securing said jack thereto, and means permitting adjustment of the upper ends of said bars for relatively spacing the holes therein to conform with the location of the projections on the brake drum and for securing said bars together against relative displacement.

2. A vehicle supporting jack of the character described comprising a base having a pair of spaced notches therein with intersecting holes extending crosswise through said notches, a pair of supporting bars having their lower ends projecting into said notches, a supporting pivot member extending through said holes and the aperture in said bars for pivotally securing the bars to said base, the said bars extending diagonally upward from said base and crossing each other at an intermediate portion thereof, the upper ends of said bars being bent towards each other and having apertures therein to receive wheel fastening projections of a motor vehicle, and adjustable means intermediate the ends of said bars comprising a slot in each bar and a fastening member extending through said slots for permitting adjustment of said bars to space the upper ends thereof to conform with the spacing of said fastening members and retain said bars against relative movement.

KENNETH F. KRON.

REFERENCES CITED

The following references are of record in the file of this patent:

UNITED STATES PATENTS

| Number | Name | Date |
|---|---|---|
| 1,611,432 | Gladstone | Dec. 21, 1926 |
| 1,617,400 | Lanning | Feb. 15, 1927 |